(12) United States Patent
Okuno et al.

(10) Patent No.: US 7,703,309 B2
(45) Date of Patent: Apr. 27, 2010

(54) ELECTRIC STEERING LOCK DEVICE AND ASSEMBLING METHOD

(75) Inventors: Masanari Okuno, Aichi (JP); Hiroyasu Hasegawa, Aichi (JP); Nobuhisa Inoue, Aichi (JP)

(73) Assignee: Tokai Rika Co., Ltd., Aichi (JP)

( * ) Notice: Subject to any disclaimer, the term of this patent is extended or adjusted under 35 U.S.C. 154(b) by 0 days.

(21) Appl. No.: 12/022,567

(22) Filed: Jan. 30, 2008

(65) Prior Publication Data
US 2008/0178644 A1 Jul. 31, 2008

(30) Foreign Application Priority Data
Jan. 30, 2007 (JP) ............... 2007-019748

(51) Int. Cl.
*B60R 25/02* (2006.01)
(52) U.S. Cl. ............ 70/186; 70/282; 74/89.36; 384/202
(58) Field of Classification Search ........... 70/182–186, 70/252, 280–282; 74/89.23, 89.36; 292/142, 292/144; 384/202, 215, 243
See application file for complete search history.

(56) References Cited

U.S. PATENT DOCUMENTS

| | | | | |
|---|---|---|---|---|
| 2,468,333 | A * | 4/1949 | Johnson | 74/89.36 |
| 3,767,240 | A * | 10/1973 | Belanger | 292/144 |
| 4,274,294 | A * | 6/1981 | Siryj et al. | 74/424.95 |
| 5,438,888 | A * | 8/1995 | Dickhoff | 74/89.36 |
| 6,655,225 | B1 * | 12/2003 | Nagai et al. | 74/89.33 |
| 6,662,672 | B2 * | 12/2003 | Someya | 74/89.23 |
| 6,776,061 | B2 * | 8/2004 | Schuettel et al. | 74/89.36 |
| 7,021,093 | B2 | 4/2006 | Fukatsu et al. | |
| 7,260,963 | B2 | 8/2007 | Suzuki et al. | |
| 2004/0007030 | A1 * | 1/2004 | Zillmann | 70/186 |
| 2004/0182121 | A1 | 9/2004 | Fukatsu et al. | |
| 2005/0138977 | A1 | 6/2005 | Suzuki et al. | |
| 2006/0021398 | A1 | 2/2006 | Hasegawa et al. | |
| 2006/0196237 | A1 * | 9/2006 | Hibino et al. | 70/186 |
| 2008/0047309 | A1 * | 2/2008 | Okuno et al. | 70/252 |

FOREIGN PATENT DOCUMENTS

JP 2003-276565 10/2003
JP 2004-231123 8/2004

* cited by examiner

*Primary Examiner*—Lloyd A Gall
(74) *Attorney, Agent, or Firm*—Scully, Scott, Murphy & Presser, P.C.

(57) ABSTRACT

An electric steering lock device has a lock body to be installed in a mounting hole part of a steering column post of a vehicle, a drive part which generates a rotation drive power, a rotation shaft to be rotated by the rotation drive power of the drive part through a gear mechanism, a lock stopper to be screwed with the rotation shaft to move axially by rotating of the rotation shaft, a lock bar which moves between a lock position for locking a steering shaft by movement of the lock stopper and an unlock position for unlocking the steering shaft, and a bush. The bush has a load receiving part to receive thrust loading of the rotation shaft at least at one side of the rotation shaft, an installation claw part to be installed by inserting in a hole part of the lock body, and a bearing claw part to receive radial load by fitting to be slidably rotatable with an external diameter of the rotation shaft.

12 Claims, 5 Drawing Sheets

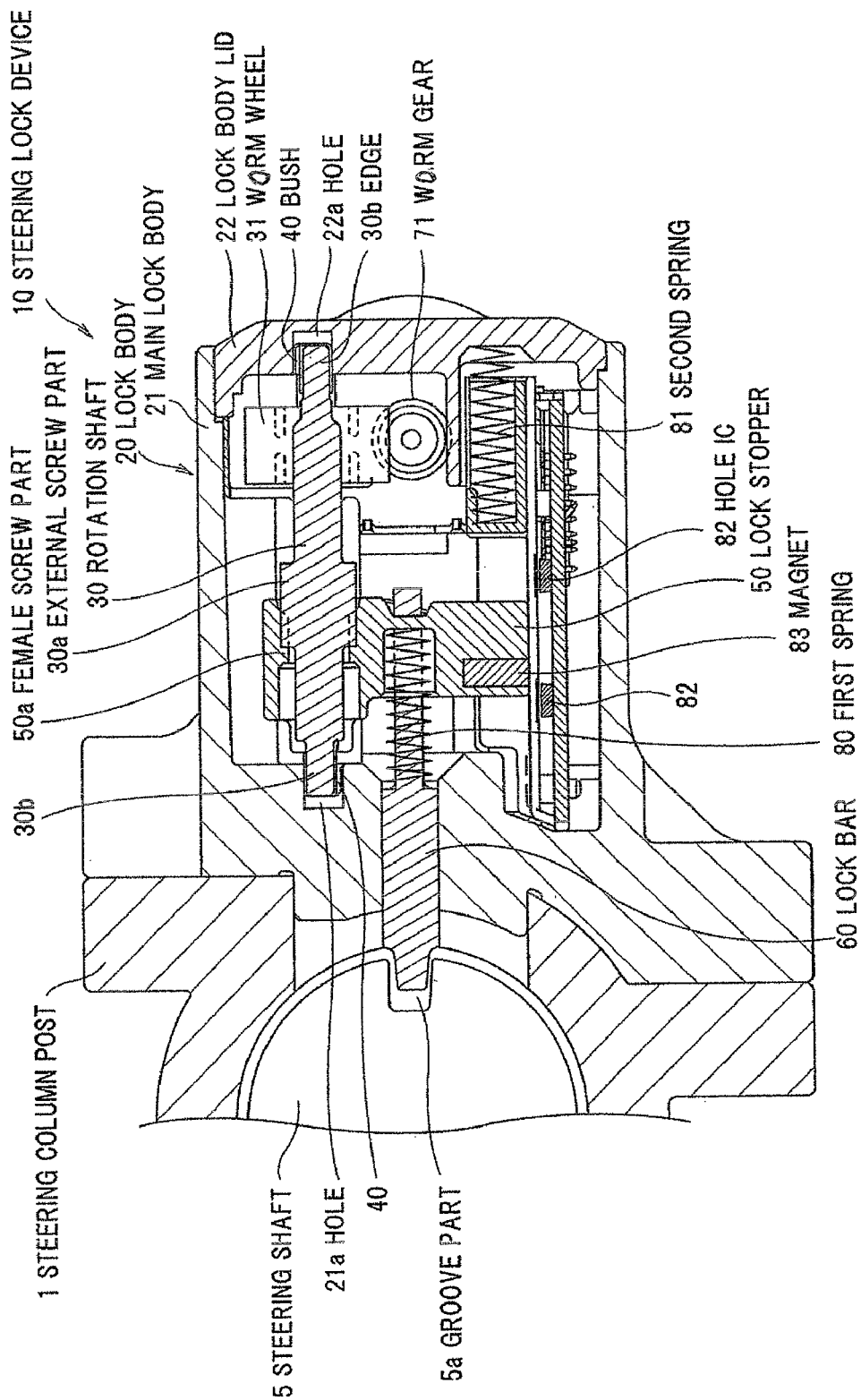

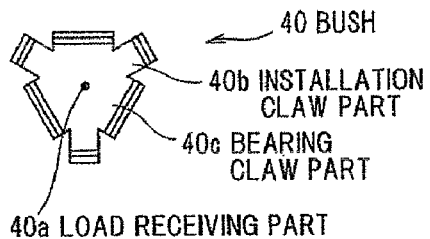
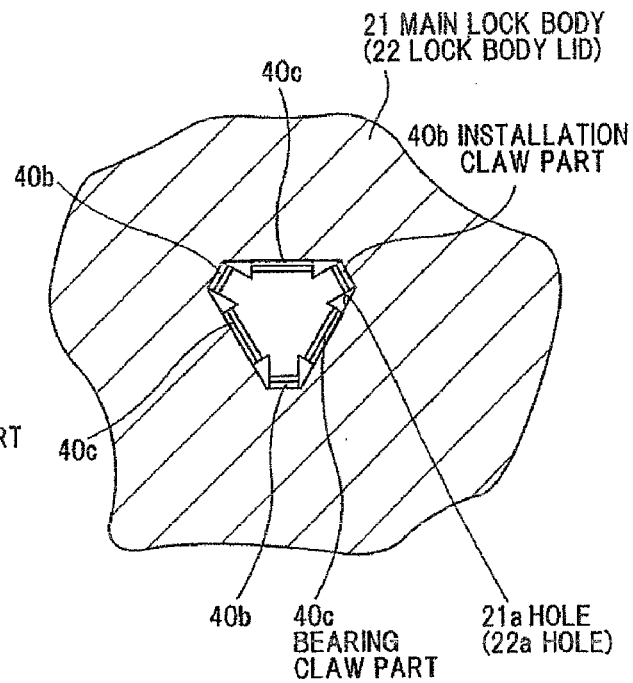
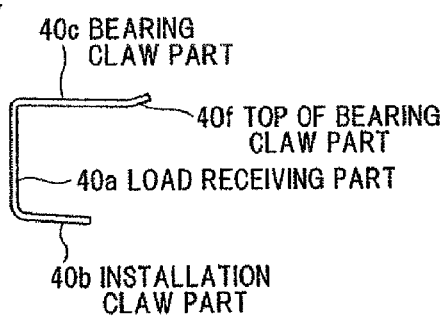
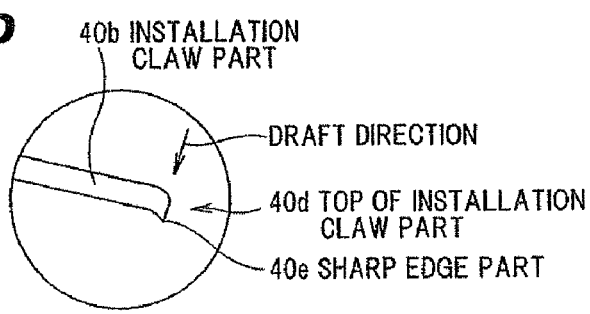

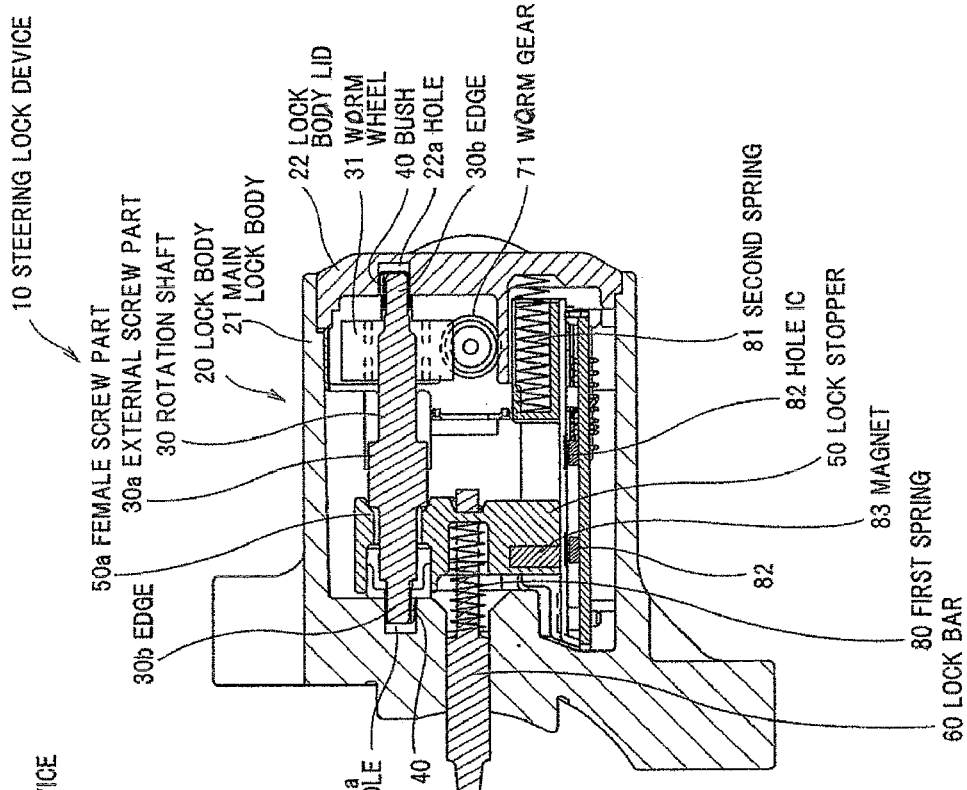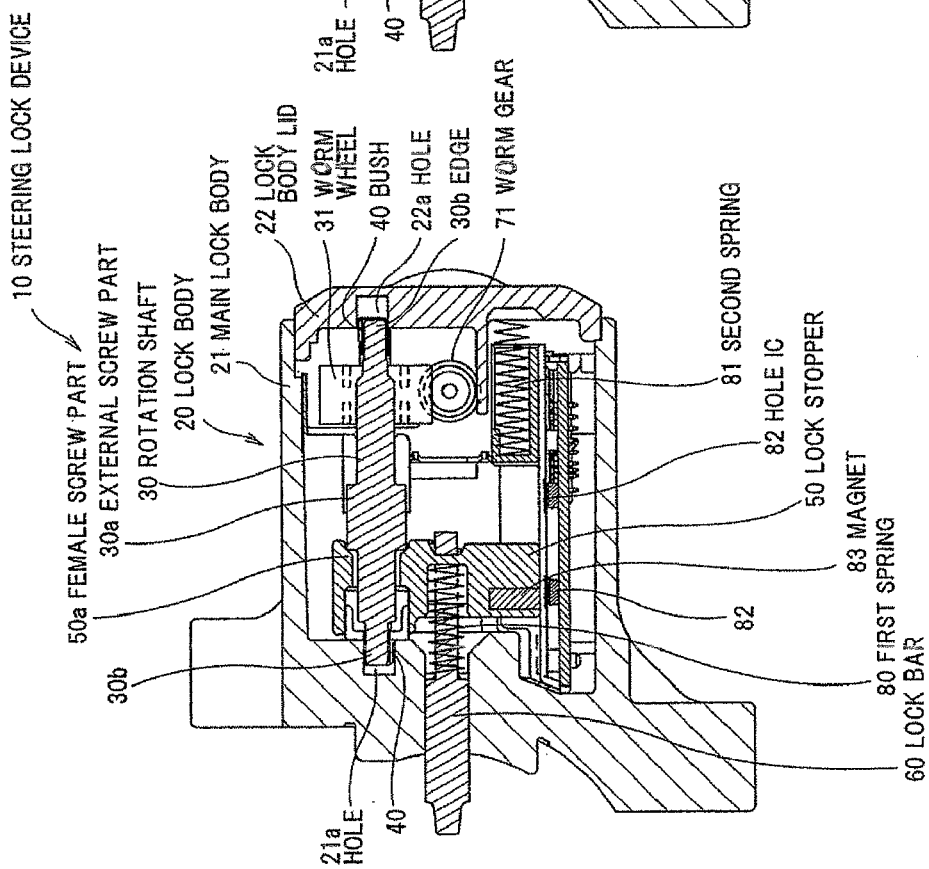

US 7,703,309 B2

ELECTRIC STEERING LOCK DEVICE AND ASSEMBLING METHOD

The present application is based on Japanese Patent Application No. 2007-019748 filed on Jan. 30, 2007, the entire contents of which are incorporated herein by reference.

BACKGROUND OF THE INVENTION

1. Field of the Invention

The present invention relates to an electric steering lock device and an assembling method, to be applied to vehicles such as automobiles.

2. Related Art

As conventional electric steering lock devices, for example, JP-A-2004-231123 and JP-A-2003-276565 disclose, respectively, an electric steering lock device comprising a worm gear which rotates by a rotary motor, a helical gear which rotates by rotation of the worm gear, a lock arm and a cam which operate in association with rotation of this helical gear, a lock stopper which moves between a lock position and an unlock position with respect to a steering shaft, a lock bar, and a lock body housing these parts has been known.

This electric steering lock device has a configuration, in which the lock bar is moved between the lock position and the unlock position with respect to the steering shaft by mutually rotating the rotary motor in opposite directions. However, according to the electric steering lock device of JP-A-2004-231123 etc., as mentioned above, since the helical gear is rotated by the rotary motor through the worm gear and the rotary motor is mutually rotated in opposite directions, thrust load is applied on the helical gear in a rotational direction at each motor rotation, and there is a disadvantage in that abnormal noise such as impact sound etc. is generated by contacting strongly with a bearing.

THE SUMMARY OF THE INVENTION

It is an object of the invention to provide an electric steering lock device and an assembling method, in which the abnormal noise such as impact sound etc. is reduced when moving the lock bar between a lock position and an unlock position with respect to a steering shaft through a gear mechanism by a rotation drive power.

[1] According to one aspect of the present invention, an electric steering lock device comprises:

a lock body to be installed in a mounting hole part of a steering column post of a vehicle, the lock body comprising a main lock body and a lock body lid;

a drive part which generates a rotation drive power;

a rotation shaft to be rotated by the rotation drive power of the drive part through a gear mechanism;

a lock stopper to be screwed with the rotation shaft to move axially by rotating of the rotation shaft;

a lock bar which moves between a lock position for locking a steering shaft by movement of the lock stopper and an unlock position for undocking the steering shaft; and a bush comprising a load receiving part to receive a thrust load of the rotation shaft at least at one end of the rotation shaft, an installation claw part to be installed by fitting to be inserted in a hole part of the lock body, and a bearing claw part to receive a radial load by fitting to be slidably rotatable with an external diameter part of the rotation shaft.

[2] In the electric steering lock device according to [1], the load receiving part of the bush may contact with an edge of the rotation shaft in a state of being slidably rotatable without any clearance at the edge of the rotation shaft.

[3] In the electric steering lock device according to [1], holes to which the bush is fitted respectively may be formed on the main lock body and the lock body lid.

[4] In the electric steering lock device according to [3], each of the holes may be formed deeply enough so that the load receiving part of the bush does not reach to a bottom of each of the holes at a time of completion of assembly.

[5] In the electric steering lock device according to [1], each of the edges of the rotation shaft may be supported to be slidably rotatable by each of the main lock body and the lock body lid at both sides through the bush.

[6] In the electric steering lock device according to [1], the bush may comprise a material having a spring property.

[7] In the electric steering lock device according to [1], the installation claw part of the bush may be configured to be opened from the load receiving part to a top of the installation claw part, so that the installation claw part is fixed to the holes formed on the main lock body and the lock body lid by press fitting.

[8] In the electric steering lock device according to [1], the bearing claw part of the bush may be configured to be narrowed from the load receiving part to a top of the bearing claw part in order to support the rotation shaft to be slidably rotatable.

[9] In the electric steering lock device according to [1], an outer circumference of the rotation shaft may be supported to be slidably rotatable by three of the bearing claw parts without any clearance.

[10] In the electric steering lock device according to [3], it is preferable that the load receiving part of the bush does not reach to the bottom of the hole of the main lock body even after the rotation shaft is built-in.

[11] In the electric steering lock device according to [1], an external screw part of the rotation shaft and a female screw part of the lock stopper may not be screwed with each other.

[12] In the electric steering lock device according to [1], an external screw part of the rotation shaft and a female screw part of the lock stopper may be screwed with each other.

[13] According another aspect of the present invention, an assembling method of the electric steering lock device comprises:

a bush insertion process to assemble temporarily by inserting a bush until a halfway of a hole part of a lock body to be installed in a mounting hole part of a steering column post of a vehicle; and a rotation shaft built-in step in which at least one end of the rotation shaft housed in the lock body is press fitted in a predetermined position while pushing the load receiving part of the bush after the bush insertion process.

EFFECT OF THE INVENTION

According to embodiments of the present invention, it is possible to provide the electric steering lock device and the assembling method, in which the generation of the abnormal noise such as impact sound etc. is reduced when moving the lock bar between the lock position and the unlock position with respect to the steering shaft through the gear mechanism by the rotation drive power.

BRIEF DESCRIPTION OF THE DRAWINGS

Next, the present invention will be explained in more detail in conjunction with appended drawings, wherein:

FIG. 2 is a cross sectional view of the steering lock device 10 installed in the steering column post 1, which shows a cross section including a centerline of a rotation shaft 30 etc. in which the steering lock device 10 is assembled as shown in FIG. 1;

FIGS. 3A to 3E are diagrams of a bush 40, wherein FIG. 3A is a plan view thereof, FIG. 3B is a side view thereof, FIG. 3C is a cross sectional view thereof, FIG. 3D is an enlarged view of a part A in FIG. 3B, and FIG. 3E is a plan view showing a state in which the bush 40 is press fitted into holes 21a, 22a of a main lock body 21 or a lock body lid 22;

FIGS. 4A and 4B are cross sectional views of the electric steering lock device 10 in the preferred embodiment according to the present invention, wherein FIG. 4A shows a state in which each components are built in from the same direction when the lock body lid 22 is not connected or fixed to the main lock body 21, and FIG. 4B shows a state in which the main lock body 21 and the lock body lid 22 are pushed from both sides to have a predetermined positional relation and assembled by fixing with springs etc. in the state in which each components are built in as shown in FIG. 4A.

DESCRIPTION OF THE PREFERRED EMBODIMENTS

Embodiment of this invention

Figure 1:
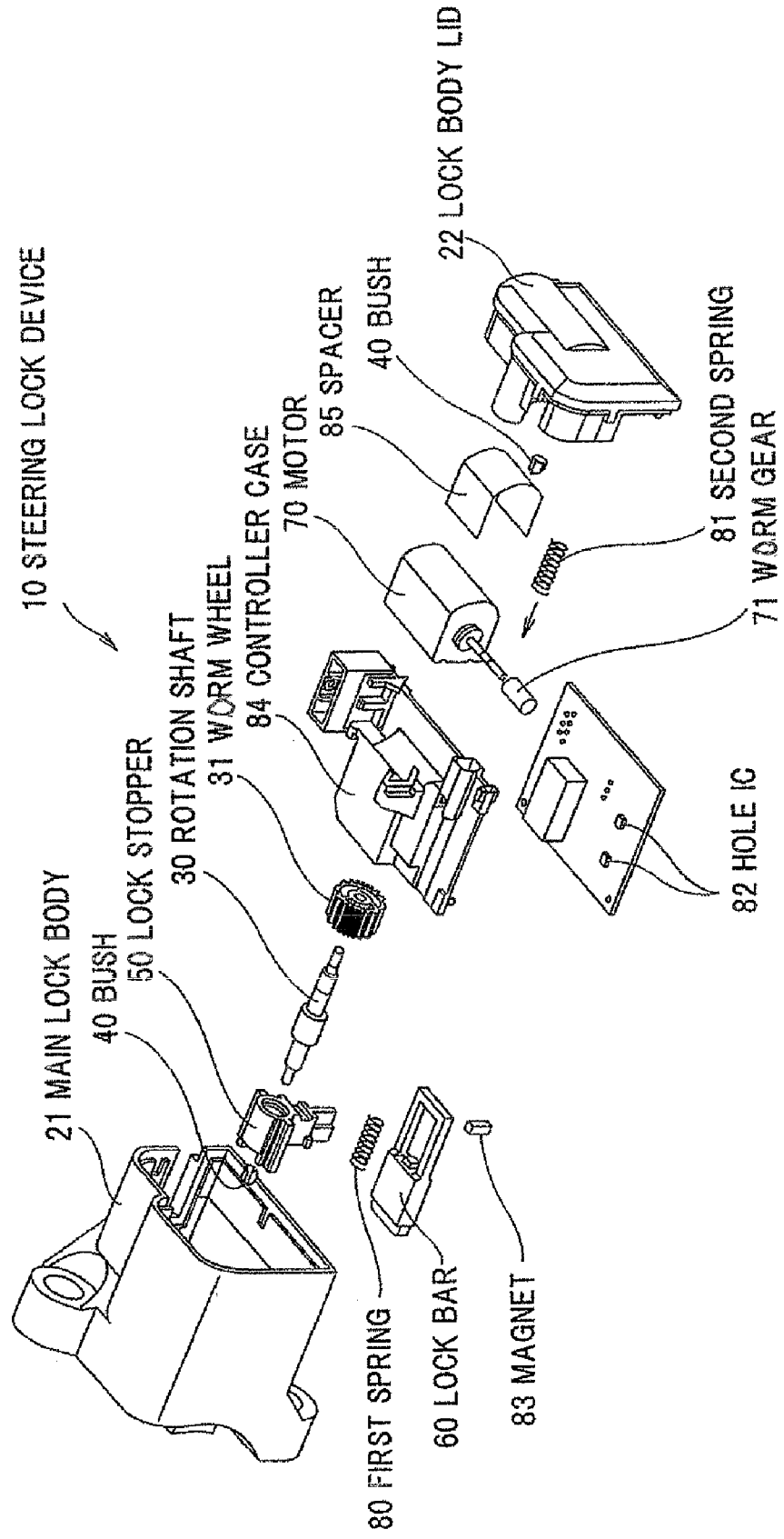
FIG. 1 is an exploded perspective view showing an assembly relation of each components of an electric steering lock device 10 to be installed in a steering column post 1 of a vehicle such as an automobile in a preferred embodiment according to the present invention.

FIG. 1 is an exploded perspective view showing an assembly relation of each components of an electric steering lock device 10 to be installed in a steering column post 1 of a vehicle such as an automobile in a preferred embodiment according to the present invention.

FIG. 2 is a cross sectional view of the steering lock device 10 installed in the steering column post 1, which shows a cross section including a centerline of a rotation shaft 30 etc. in which the steering lock device 10 is assembled as shown in FIG. 1.

The steering lock device 10 comprises a lock body 20, a rotation shaft 30, a worm wheel 31, a bush 40, a lock stopper 50, a lock bar 60, a motor 70 and a worm gear 71 etc.

The lock body 20 comprises a main lock body 21 and a lock body lid 22. The main lock body 21 and the lock body lid 22 comprise a predetermined material, for instance, magnesium die-cast or aluminum die-cast. The main lock body 21 is installed in a predetermined position of the steering column post 1. In the state that this main lock body 21 is installed in the steering column post 1, a lock bar 60 (to be described later) projected from a substantial central part of the main lock body 21 moves between a lock position for locking a rotation of a steering shaft 5 and an unlock position for unlocking the steering shaft 5, to switch a connecting state and a non-connecting state with a groove part 5a of the steering shaft 5.

Holes 21a and 22a to which the bush 40 (to be described later) is fitted respectively by press fitting are formed on the main lock body 21 and the lock body lid 22. These holes 21a and 22a are formed deeply enough so that a load receiving part 40a of the bush 40 does not reach to a bottom of the holes 21a and 22a at the time of completion of assembly.

In the rotation shaft 30, an external screw part 30a, which is screwed with a female screw part 50a formed on the lock stopper 50 (to be described later), is formed in an intermediate part, and the worm wheel 31 on which a gear is formed is installed. Each of edges 30b are supported by and slidably rotatable with bushes 40 mounted in the main lock body 21 and the lock body lid 22.

FIGS. 3A to 3E are diagrams of the bush 40, wherein FIG. 3A is a plan view thereof FIG. 3B is a side view thereof, FIG. 3C is a cross sectional view thereof along A-A line in FIG. 3A, FIG. 3D is an enlarged view of a part A in FIG. 3B, and FIG. 3E is a plan view showing a state in which the bush 40 is press fitted into holes 21a, 22a of a main lock body 21 or a lock body lid 22.

The bush 40 comprises a material having a spring property such as stainless steel, and is installed by fitting the main lock body 21 and the lock body lid 22 into the holes 21a and 22a with a predetermined fit. The bush 40 is provided with the load receiving part 40a, an installation claw part 40b, and a bearing claw part 40c. The load receiving part 40a functions as a contact face with the edge 30b of the rotation shaft 30, and three installation claw parts 40b and three bearing claw parts 40c are respectively provided to protrude alternately in a substantially vertical direction from this contact face side.

The installation claw part 40b is configured to be opened (flared) from the load receiving part 40a to a top of an installation claw part 40d, so that the installation claw part 40b can be fixed to the holes 21a and 22a formed on the main lock body 21 or the lock body lid 22 by press fitting. For instance, each of the top of installation claw parts 40d extends by only 0.2 mm outward with respect to a dimension in the load receiving part 40a. Furthermore, as shown in FIG. 3D, the installation claw part 40b is such configured that a surface press fitted to the holes 21a and 22a functions as a burr side by adjusting a draft direction to a direction indicated by an arrow at the time of press work, and a sharp edge part 40e is embedded into the holes 21a and 22a, not to be dropped off easily.

The bearing claw part 40c is configured to grasp from the load receiving part 40a to a top of a bearing claw part 40f when the load receiving part 40a receives a thrust load, in order to support the rotation shaft 30 and for the rotational shaft 30 to be slidably rotatable. The bearing claw part 40c supports an outer circumference of the rotation shaft 30 using three claw parts, 40b, 40c, 40d. For instance, each of the top of bearing claw parts 40f is inclined by only 0.1 mm inward with respect to a dimension of the load receiving part 40a. For facilitating an assembly work with the rotation shaft 30, each of the top of bearing claw parts 40f extend angularly from bearing claw part 40c, for example, 0.2 mm outwardly.

In the rotation shaft 30, the outer circumference of the rotation shaft 30 is supported to be slidably rotatable by the three bearing claw parts 40c without any clearance, and the edge 30b contacts the load receiving part 40a of the bush 40 being slidably rotatable without any clearance by the main lock body 21 and the lock body lid 22 through the bush 40 respectively. As a result, the rotation shaft 30 is supported to be slidably rotatable without any clearance in both radial and thrust directions.

The lock stopper 50 is screwed with an external screw part 30a of the rotation shaft 30 at the female screw part 50a, and is movable in an axial direction of the rotation shaft 30 by the rotation of the rotation shaft 30. The lock stopper 50 is connected to the lock bar 60 (to be described later) through the first spring 80. Furthermore, a controller case 84 is provided with a second spring 81, so as to give a bias load to the lock stopper 50 in a direction opposite to the bias load given by the first spring 80, so that the external screw part 30a of the rotation shaft 30 can be screwed with the female screw part 50a of the lock stopper 50, even if the lock stopper 50 moves too much in the non-connecting direction (the unlock direction) between the lock bar 60 and the steering shaft 5. A magnet 83 is installed under the lock stopper 50 to detect the position of the lock stopper 50 by a hole IC 82.

The lock bar 60 is connected with the lock stopper 50 through the first spring 80 and is movable between the lock position and the unlock position, so as to switch the connecting or non-connecting state with the groove part 5a of the steering shaft 5 by the rotation of the rotation shaft 30.

The motor 70 as a driving actuator is installed in the main lock body 21 through the controller case 84 and a spacer 85, and the worm gear 71 is installed around an axis of the motor 70. The worm gear 71 is screwed with a worm wheel 31 installed around the rotation shaft 30. As a result, the rotation of the motor 70 is transmitted to the rotation shaft 30 through the worm gear 71 and the worm wheel 31.

Assembling Method of the Electric Steering Lock Device in the Preferred Embodiment of the Present Invention The bush 40, the lock bar 60, the first spring 80, the lock stopper 50, the rotation shaft 30, the controller case 84, the second spring 81, the motor 70, the spacer 85, the bush 40, and the lock body lid 22 are built into the main lock body 21 from the same direction (from a right side in FIG. 1).

Here, the worm wheel 31 is previously installed around the rotation shaft 30. Furthermore, it is preferable to provide a bush insertion process, in which the bush 40 is press fitted into the main lock body 21 and the holes 21a, 22a of the lock body lid 22 until a halfway of the installation claw part 40b, as a temporary assembled state. Furthermore, it is preferable to previously prepare a temporary assembly of the lock bar 60, the first spring 80 and the lock stopper 50, as a sub-assay.

FIGS. 4A and 4B are cross sectional views of the electric steering lock device 10 in the preferred embodiment according to the present invention.

FIG. 4A shows a state in which each components are built in from the same direction and the lock body lid 22 is not connected or fixed to the main lock body 21, and FIG. 4B shows a state in which the main lock body 21 and the lock body lid 22 are pushed from both sides to have a predetermined positional relation and assembled by fixing with springs etc. in the state in which each components are built in as shown in FIG. 4A.

In the rotation shaft 30, the outer circumference of the rotation shaft 30 is supported to be slidably rotatable by the three bearing claw parts 40c without any clearance, and the edge 30b contacts the load receiving part 40a of the bush 40 being slidably rotatable without any clearance by the main lock body 21 and the lock body lid 22 through the bush 40 respectively. As a result, the rotation shaft 30 is supported to be slidably rotatable without any clearance in both radial and thrust directions.

In the above-mentioned step (FIG. 413), the external screw part 30a of the rotation shaft 30 and the female screw part 50a of the lock stopper 50 are not screwed with each other yet, i.e. in a spinning state. Here, by applying a load on a front edge of the lock bar 60, a load is applied to the lock stopper 50 in a direction to screw with the rotation shaft 30 through the first spring 80. By rotating the motor 70 so as to move the lock bar 60 in the direction to be the non-connecting state (an unlock state) with the groove part 5a of the steering shaft 5 under this condition, the external screw part 30a of the rotation shaft 30 and the female screw part 50a of the lock stopper 50 are screwed with each other to be an assembled state as shown in FIG. 2 (the screw step).

According to the respective steps mentioned above, the assembling of the electric steering lock device 10 is completed, and it is possible to install the electric steering lock device 10 to the steering column post 1 in this state.

Function of the Electric Steering Lock Device in the Preferred Embodiment of the Present Invention In the state that the lock bar 60 is connected with the groove part 5a of the steering shaft 5 (FIG. 2), when operating a switch of the vehicle to a position such as "ACC", "ON" and "START", the motor 70 rotates in a predetermined rotational direction, the lock bar 60 is activated through the worm wheel 31, the rotation shaft 30 and the lock stopper 50, and the connection of the lock bar 60 and the steering shaft 5 are unlocked, to provide the non-connecting state. In a process of this operation, the motor 70 rotates at high speed (for instance, 9600 rpm). As a result, the rotation shaft 30 receives a strong force between the edge 30b and the load receiving part 40a of the bush 40 as a reaction. However, the edge 30b and the load receiving part 40a contact with each other in a state of being slidably rotatable without clearance and without backlash, abnormal noise such as impact sound etc. is not generated in the operation as mentioned above. Furthermore, it is similar in the radial direction. Furthermore, since the bush 40 comprises, for instance, the stainless steel, problems of scraping or abrasion by the rotation of the rotation shaft 30 do not occur in a long-term use.

Figure 5:
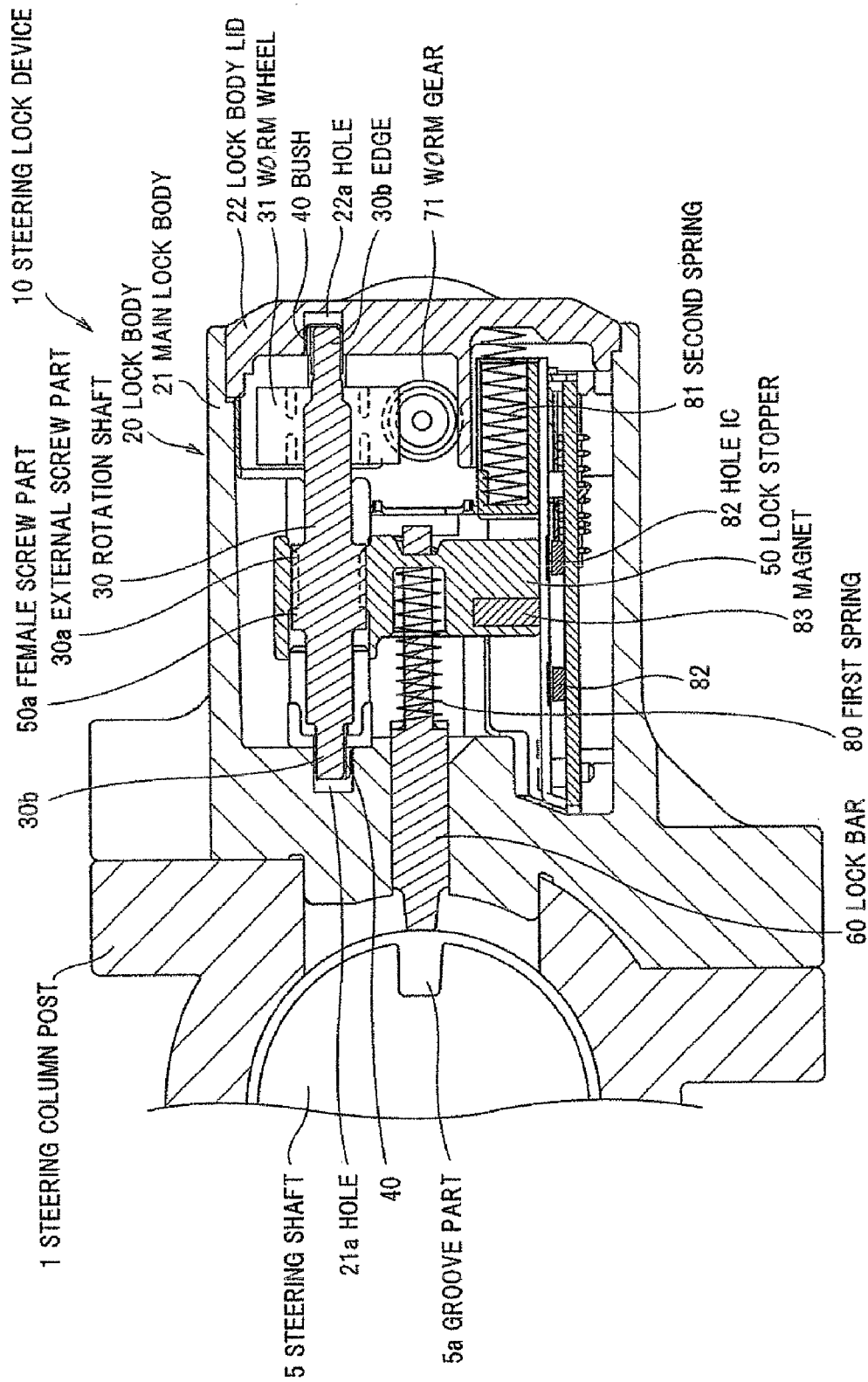
FIG. 5 is a cross sectional view of the electric steering lock device 10 in the preferred embodiment according to the present invention showing a non-connecting state, in which a lock bar 60 is not connected with a groove part 5a of a steering shaft 5.

FIG. 5 is a cross sectional view of the electric steering lock device 10 in the preferred embodiment according to the present invention showing a non-connecting state, in which a lock bar 60 is not connected with a groove part 5a of a steering shaft 5.

In the state that the lock bar 60 is not connected with the groove part 5a of the steering shaft 5, when operating the switch of the vehicle to a position of "LOCK", the motor 70 rotates in a rotational direction opposite to the rotational direction in the operation as mentioned above, the lock bar 60 is activated through the worm wheel 31, the rotation shaft 30, the lock stopper 50 and the first spring 80, and the lock bar 60 and the groove part 5a of the steering shaft 5 are unlocked, to provide the connecting state. In this case, similarly to the above, the rotation shaft 30 receives the strong force between the edge 30b and the load receiving part 40a of the bush 40 as a reaction. However, the edge 30b and the load receiving part 40a contact with each other in the state of being slidably rotatable without clearance and without backlash, the abnormal noise such as the impact sound etc. is not generated in the operation as mentioned above. When the position of the groove part 5a does not coincide with the position of the lock bar 60, the connecting state is realized by connecting the lock bar 60 and the groove part 5a of the steering shaft 5 with the bias load of the first spring 80 at the stage that the position of the groove part 5a coincides with the position of the position of the lock bar 60 by the rotation of the steering shaft 5.

Effect of the Preferred Embodiment According to the Present Invention

In the connecting and the non-connecting operations of the lock bar 60 with the groove part 5a of the steering shaft 5, the rotation shaft 30 is rotated at high speed by the motor 70 and a strong reaction is generated to the rotation shaft 30. However, according to embodiment of the present invention, the generation of the abnormal noise such as impact sounds etc. by the operation mentioned above is greatly reduced as being without any clearance in the thrust and the radial directions between the bush 40 and the rotation shaft 30.

Furthermore, for instance, since the bush 40 comprising the stainless steel is used as a bearing, problems of scraping or abrasion by the rotation of the rotation shaft 30 do not occur in a long-term use.

Furthermore, as the sharp edge part 40e is formed on the installation claw part 40b of the bush 40, there is an effect of suppressing an easy occurrence of drop-off in a temporally assembly process into the main lock body 21 or the holes 21a, 22a of the lock body lid 22.

Furthermore, since the assembly method of the electric steering lock device comprises a bush insertion process to assemble temporarily by inserting the bush 40 until a halfway of the holes 21a, 22a of the lock body 20 (the main lock body 21 and the lock body lid 22) and a rotation shaft built-in step in which the edge 30b of the rotation shaft 30 housed in the lock body 20 is press fitted in a predetermined position while pushing the load receiving part 40a of the bush 40 after the bush insertion process, the load receiving part 40a of the bush 40 is press fitted to the holes 21a and 22a while being pushed by the edge 30b of the rotation shaft 30. As a result, it is possible to assemble the rotation shaft 30 in a state to be slidably rotatable without any clearance between the edge 30b of the rotation shaft 30 and the bush 40.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An electric steering lock device comprising:
   a lock body to be installed in a mounting hole part of a steering column post of a vehicle, the lock body comprising a main lock body and a lock body lid;
   a drive part which generates a rotation drive power;
   a rotation shaft to be rotated by the rotation drive power of the drive part through a gear mechanism;
   a lock stopper to be screwed with the rotation shaft to move axially by rotating of the rotation shaft;
   a lock bar which moves between a lock position for locking a steering shaft by movement of the lock stopper and an unlock position for unlocking the steering shaft; and
   a bush comprising a load receiving part to receive a thrust load of the rotation shaft using a mating portion at least at one end of the rotation shaft, the mating portion fitting in a hole defined by the lock body, the bush having an installation claw part and a bearing claw part, the bush fitting in the hole defined by the lock body, the bearing claw part receiving a radial load when edges of the mating portion of the rotation shaft are mated to the bearing claw part and the bearing claw part being slidably rotatable with the edges of the mating portion of the rotation shaft.

2. The electric steering lock device according to claim 1, wherein the load receiving part of the bush contacts the edges of one end of the rotation shaft and the bush is slidably rotatable with the edges of the rotation shaft.

3. The electric steering lock device according to claim 1, wherein a plurality of bushes are fitted into respective holes formed in the main lock body and the lock body lid.

4. The electric steering lock device according to claim 3, wherein each of the holes is formed deeply enough so that the load receiving part of the bush does not reach to a bottom of each of the holes at a time of completion of assembly.

5. The electric steering lock device according to claim 1, wherein each of the edges of the rotation shaft is supported and slidably rotatable in the main lock body and the lock body lid using a bush.

6. The electric steering lock device according to claim 1, wherein the bush comprises a material having a spring property.

7. The electric steering lock device according to claim 1, wherein the installation claw part of the bush is configured to be opened from the load receiving part to a top of the installation claw part, so that the installation claw part is fixed to the hole formed in the main lock body or a hole formed in the lock body lid by press fitting.

8. The electric steering lock device according to claim 1, wherein the bearing claw part of the bush is configured to extend from the load receiving part to a top of the bearing claw part in order to support the rotation shaft and be slidably rotatable.

9. The electric steering lock device according to claim 1, wherein an outer circumference of the rotation shaft is supported and slidably rotatable using three of the bearing claw parts without any clearance.

10. The electric steering lock device according to claim 3, wherein the load receiving part of the bushes do not reach a bottom of their respective holes in the main lock body or the lock body lid even after the rotation shaft is mounted in the holes.

11. The electric steering lock device according to claim 1, wherein an external screw part of the rotation shaft and a female screw part of the lock stopper are in mating relation with each other and partially screwed together.

12. The electric steering lock device according to claim 1, wherein an external screw part of the rotation shaft and a female screw part of the lock stopper are screwed together.

* * * * *